(12) United States Patent  
Craib et al.

(10) Patent No.: US 8,468,567 B2  
(45) Date of Patent: Jun. 18, 2013

(54) PLACE-SHIFTING APPARATUS AND SYSTEM

(75) Inventors: Glenn Ritchie Gordon Craib, Dunfermline (GB); Anthony David Combe, Fife (GB)

(73) Assignee: Motive Television PLC, Gloucester (GB)

( * ) Notice: Subject to any disclaimer, the term of this patent is extended or adjusted under 35 U.S.C. 154(b) by 937 days.

(21) Appl. No.: 12/304,091

(22) PCT Filed: Jun. 11, 2007

(86) PCT No.: PCT/GB2007/002151  
§ 371 (c)(1), (2), (4) Date: Jun. 24, 2009

(87) PCT Pub. No.: WO2007/141555  
PCT Pub. Date: Dec. 13, 2007

(65) Prior Publication Data  
US 2010/0146527 A1    Jun. 10, 2010

(30) Foreign Application Priority Data  
Jun. 9, 2006 (GB) .................................. 0611435.9

(51) Int. Cl.  
*H04N 7/18* (2006.01)

(52) U.S. Cl.  
USPC ................................. 725/74; 725/25; 725/81

(58) Field of Classification Search  
USPC .......................................................... 725/74  
See application file for complete search history.

(56) References Cited

U.S. PATENT DOCUMENTS

| | | | |
|---|---|---|---|
| 6,618,754 B1* | 9/2003 | Gosling | 709/220 |
| 7,114,174 B1* | 9/2006 | Brooks et al. | 725/105 |
| 7,630,960 B2* | 12/2009 | Koike et al. | 1/1 |
| 2002/0027612 A1* | 3/2002 | Brill et al. | 348/473 |
| 2002/0054206 A1* | 5/2002 | Allen | 348/14.04 |
| 2002/0156875 A1* | 10/2002 | Pabla | 709/220 |
| 2003/0105812 A1* | 6/2003 | Flowers et al. | 709/203 |
| 2003/0156218 A1* | 8/2003 | Laksono | 348/388.1 |
| 2004/0153528 A1* | 8/2004 | Suzuki | 709/219 |

(Continued)

FOREIGN PATENT DOCUMENTS

EP           1 443 766        8/2004  
WO   WO 2005122025 A2 *  12/2005

OTHER PUBLICATIONS

"Share it deliverable #3" Nov. 20, 2002: Internet retrieval http://www.extra.research.philips.com/euprojects/share_it/deliverables/share-it-nob-31nov02-d3v10-final.pdf.*

(Continued)

*Primary Examiner* — Robert Hance  
(74) *Attorney, Agent, or Firm* — Foley & Lardner LLP; John D. Lanza

(57) ABSTRACT

A place-shifting system for distributing video content from a content source (2) has apparatus including a set-top box (STB) (1) with a digital interface to a sender (6). The sender (6) receives video content from the STB (1) conditional upon access permissions that may be associated with a subscription. The permissions may also be determined using the identifier of a viewer device (9). The viewer (9) requests connection to a specific sender (6) by sending an association request to an association server (8) via a network connection (10). The association server (8) returns location information specific to the sender (6) being requested to the viewer (9). The viewer (9) and sender (6) then communicate directly (11) to establish communication and to start transfer of video and other information. The sender (6) can remove content protection from the video content before transcoding, re-applying content protection and sending it. The viewer (9) can act as a remote control for the STB (1) and modifies of the format of On-Screen Display data depending on its video output capability.

5 Claims, 6 Drawing Sheets

U.S. PATENT DOCUMENTS

2004/0172658 A1* 9/2004 Rakib et al. .................. 725/120
2006/0098596 A1* 5/2006 Park et al. .................... 370/329

OTHER PUBLICATIONS

"Share it deliverable # 3: Description of example applications" Nov. 30, 2002 Retrieved from the Internet on Aug. 16, 2004: http://www.extra.research.philips.com/euprojects/share_it/deliverables/share-it-nob-31nov02-d3v10-final.pdf.

Invitation to Pay Additional Fees including Communication Relating to the Results of the Partial International Search, PCT Application No. PCT/GB2007/002151, mailed on Oct. 10, 2007.

* cited by examiner

PLACE-SHIFTING APPARATUS AND SYSTEM

The present invention relates to place-shifting, in particular to media receivers such as set-top boxes operating with media sending devices and media viewing devices.

A place-shifting system can allow an end customer to view their own audio/video content anywhere in the world.

There has been a long held requirement for the ability to watch/listen to audio/video content anywhere. This demand has been sated over the years by the development of portable radios, walkmans, and portable music players such as the iPod™ from Apple Inc. The developments to date have been heavily biased towards audio solutions, as this is both an easier solution technically and cheaper to produce. The development of portable music players, has led on to the development of portable DVD (Digital Video Disc) players and Portable Media Players (PMP), which allow the playback of pre-recorded content anywhere. Viewing broadcast Television (TV) content anywhere, has only so far been achieved with portable TV sets.

The type of use differs between audio and video content. Whereas a user may wish to listen to a given piece of music a number of times, the majority of video content is only viewed once. Therefore the majority of users require that they can watch a video event once, so the local storage of this event is not needed. For repeated viewing of a given event (television programme, film etc) the after sales market of DVD is extremely strong, and this has been a major source of growth in DVD sales over the last 5 years.

The multi-channel TV environment has increased over the last decade, driven by the adoption of services from satellite and cable content providers, initially using analogue technology, but now almost exclusively using digital transmission methods. In recent years, these content providers have had competition from digital TV transmitted using terrestrial methods, more akin to the analogue experience the user has been used to. The growth of these areas have in part been driven by broadcast standards, such as DVB-S (Digital Video Broadcasting-Satellite), DVB-T (Digital Video Broadcasting-Terrestrial) etc. In order to access the multi-channel offerings, the consumer has grown to accept additional hardware within the home, in the form of a digital receiver or Set-Top Box (STB). In fact, there is a move to integrate some STB functionality into TV sets, for example some TVs today have a DVB-T decoder built-in to allow terrestrial channels to be viewed without a separate box.

There exist some other multi-channel sources of content, for example Internet Protocol TV (or IPTV) and a number of developing standards for mobile TV solutions. IPTV is a market which has had predictions of large growth, and in some cases has an installed base of the order of a few hundred thousand customers, but has not made the breakthrough to the mass market. Mobile TV services are in their infancy, and have their growth potential hampered by many conflicting standards, such as DVB-H (Digital Video Broadcasting-Handheld), MediaFlo™ (from Qualcomm), DAB-V etc. For both mobile TV and IPTV, a further restriction has been in the number of channels available. Within the mobile TV environment, the number of channels is restricted by the available bandwidth, for IPTV, the channels are restricted as the channel suppliers have existing distribution methods. For example, the Disney Channel produced by Walt Disney Inc., is available through satellite and cable providers, it is also available through some IPTV providers, but not all.

A further service for delivering video content has arisen in a number of guises over the last decade or so. Video On Demand (VOD) has a number of delivery methods, from a dedicated STB linked to a repository of video, to an additional service offered by cable/IPTV providers, to the ability to select various start times for a film using satellite distribution. The result of this video on demand, is that the user has the ability to access content (mostly either new films at a premium, or old content) at their request. This market is strongest for film, and is used by many hotel chains for a premium service. Indeed may airlines now offer a VOD service to the passengers seat.

Therefore the users' largest choice of channels comes from a STB, either via a cable or satellite distribution method. However, it is a problem that this wide choice of channels is restricted to viewing only on TVs directly connected to the users STB.

Further developments in STB technology have resulted in the Digital Video Recorder (DVR), also sometimes called the Personal Video Recorder (PVR). The DVR is a STB which contains a Hard Disc Drive (HDD) which can be used to Time-Shift TV content. This means that a user can select to record a programme onto the HDD for later viewing. It was predicted that the growth of DVR would result in the demise of the TV schedule, as the user could use this, coupled with VOD, to create their own channel. However, the experience to date is that while the DVR service is well used by those customers who have the service, TV is still an event driven medium, with the schedule at the cornerstone of the experience. This may be a generational factor with future generations being less dependant on schedules and physical media. However, there will still be a demand for a scheduled service to support events, such as sports. Finally, even if the "schedule" is removed, content will still have to be released at a certain time for viewing. It is human nature to want to view this content as soon as available.

Digital television services have given rise to a new user experience, that of "interactive TV". The interactive services on offer to date usually centre around an activation when available. The activation of the interactive service can offer a number of options to the viewer, such as multiple audio options, camera angles, or different events (such as different tennis matches during Wimbledon). Interactive services are also available during advertisements, allowing a more in-depth examination of a product, background information, brochure request, competitions etc. When an interactive programme is recorded on current generation DVR systems, only the "main" broadcast is recorded. The result of this is that any additional services are not available when the event is replayed at a later time.

A further impact of the growth of DVR services is that the content recorded on the HDD is only accessible via that particular STB, and as for the multi-channel viewing, only for a TV set connected directly to that STB. There have been some attempts to support download of the content within a DVR onto a Portable Media Player (PMP), using for example TiVo-to-go from TiVo Inc. The TiVo-to-go service requires that the DVR be connected to a home personal computer (PC) and that the required programme is downloaded from the DVR. From the PC, the content can then be formatted for a given supported PMP. This service, obviously, requires that the customer also posses a PC, and a PMP. Other services, such as XTV from NDS Ltd., allow for direct connection between a compatible PMP and a STB, but this is only supported with certain PMP and STB, for example those branded by one supplier.

A critical issue for any content owner or content provider is that of content protection. The invention and commercialisation of the analogue tape recorder was heralded with bring about the end of the music industry, because it could very simply copy a piece of music. However, the death of the music industry did not take place. Copies of an analogue source resulted in a reduction in quality, so copies of copies were a further reduction etc. With the advent of digital audio (primarily in the form of Compact Disc—CD) the source could be shown to suffer no degradation over time. This coupled with the creation of CD recordable and re-writable discs, created the opportunity for perfect copies to be made from the original source. The specification of the CD allowed for some minimal content protection, to permit or restrict copies. However, the use of PC copying software, coupled with a "fair use" requirement has meant that this is a largely ignored method of protecting the content. As audio has moved to more compressed formats, supporting the growing portable device and download markets, more sophisticated content protection has been required. This content protection can take many forms (such as Windows media DRM, Apple Fairplay etc) but the basic purpose is to tie the content to a particular device or PC. The content owner can specify the rights associated with a piece of audio, for example download to a portable device, creation of a CD etc.

The video market has faced similar issues to that covered above for the audio market. In the video/TV market, content protection has a number of forms, one of the most basic which is applied to content distributed on video cassette (such as VHS from JVC) is the use of analogue technologies, such as that developed by Marcovision Inc. The analogue technologies rely on altering the synchronisation between audio and video, which is transparent to a TV, but will disrupt a video recorder. There was also an argument that because an analogue copy of an analogue recording would result in a reduction in quality, then there was less of a concern over the generation of multiple copies. However, this argument was not made by the content providers. The advent of digital TV, and DVD removes this argument, as any copy of a digital event will be the same quality as the original. For DVD a content protection system was built into the disc standard. Content Scrambling System (CSS) relies on the knowledge of secret hardware keys to decrypt the video stored on the disc. The CSS system has been broken, and a crack posted on the internet, allowing digital copies of DVD discs to be made. However, this is an illegal activity and not a simple one step process, thus reducing the impact.

Content protection is often intertwined with conditional access (CA). A CA system is required to allow a STB to know the rights associated with a given piece of media. The rights associated can vary on a user by user basis, depending on the agreement between the customer and the content provider. Content protection can be viewed as the encryption around the content, and CA as the rights to view the content. Many CA/content protection systems exist in the STB field, and most rely on smartcards to hold some of the required information to decrypt the content.

There is a demand to have a service which offers full access to all TV channels available, as well as to content recorded using a DVR. The customer requirement would be to have the content available wherever they are, supported on a range of devices, such as mobile telephones, portable DVD players, PMP's, etc. This requirement could be satisfied by using a service which circumvents the CA on a piece of media, but using the analogue audio/video outputs which are currently still used to connect to a TV. These analogue connections may have Macrovision protection, but no CA. As a result there is no link between the content provider and the user accessing the service.

An analogue solution is a first generation approach, as has been seen with audio/video distribution services in the past. A digital service would offer the maximum amount of flexibility and control. Additionally, a service based on the use of analogue signals from the STB to the TV will have a limited shelf-lite. This is because the connection from the STB to the TV is transitioning from analogue to digital, and in particular HDMI. HDMI is a digital connection standard, which also incorporates content protection.

It is an object of aspects of the present invention to provide improved apparatus and a place-shifting system for video content distribution, including media receiver, sender and presentation devices and an association server.

According to a first aspect of the present invention, there is provided a media receiver comprising:
 a digital interface operable to connect to a media sender device;
 a receiving module operable to receive a request for video content from the media sender device via the digital interface; and
 a transmitting module operable to transmit video content to the media sender device responsive to the received request.

Preferably, the media receiver further comprises a conditional access module operable to determine access permissions and the transmitting module is operable to transmit the video content to the media sender device conditional upon the determined access permissions.

Preferably, the conditional access module is operable to determine access permissions associated with a subscription.

Preferably, the conditional access module is operable to configure the access permissions of the media sender device.

Preferably, the request for video content comprises an identifier of a media presentation device Preferably, the conditional access module is operable to determine access permissions associated with the media presentation device using the identifier of the media presentation device.

Preferably, the access permissions relate to permitted channels.

Preferably, the access permissions relate to supported remote functions.

Preferably, the media receiver further comprises a source of video content.

Preferably, the source of video content comprises a tuner.

Optionally, the source of video content comprises a storage module.

Preferably, the transmitting module is operable to transmit video content to the media sender device from the source of video content.

Preferably, the media receiver further comprises a plurality of sources of video content.

Preferably, the transmitting module is operable to transmit first video content to the media sender device from a first source of the plurality of sources while the media receiver is operable to transmit second video content to a second media presentation device from a second source of the plurality of sources.

Preferably, the media receiver further comprises a tuner module operable to provide the video content for transmission to the media sender device.

Preferably, the media receiver further comprises a storage module operable to provide the video content for transmission to the media sender device.

According to a second aspect of the present invention, there is provided a media sender device comprising:
 a digital interface operable to connect to a media receiver;

a processor operable to transmit a request for video content to the media receiver via the digital interface; and a receiving module operable to receive the requested video content from the media receiver; and a sending module operable to transmit the received video content to a media presentation device.

Preferably, the request for video comprises an identifier of a media presentation device.

Preferably, the media sender further comprises a content protection module.

Preferably, the content protection module is operable to remove content protection from the video content after its reception from the media receiver.

Preferably, the content protection module is operable to apply content protection to the video content prior to its transmission to the media presentation device.

Preferably, the media sender device further comprises an identification module operable to transmit an identifier of the media sender device to an association server.

Preferably, the identification module is further adapted to transmit an activity status to the association server.

Preferably, the media sender device is operable to receive a request for video content from the media presentation device.

Preferably, the media sender device further comprises a decoder module operable to decode the received video content.

Preferably, the content protection module is operable to remove content protection from the video content after its decoding.

Preferably, the media sender device further comprises an encoder module operable to encode the decoded video content.

Preferably, the content protection module is operable to apply content protection to the video Content prior to its encoding and transmission to the media presentation device.

Preferably, the encoding comprises compression.

Preferably, the encoder module is operable to encode the decoded video content depending on the capability of the media presentation device.

Preferably, the encoder module is operable to dynamically adjust the encoding depending on connection speed between the media sender device and the media presentation device.

Preferably, the media sender device is operable to receive OSD (On-Screen Display) data from the media receiver and transmit the OSD data to the media presentation device.

Preferably, the media sender device is operable to transmit the OSD data independently of the transmitted video content.

Optionally, the media sender device is operable to modify the format of the OSD data prior to transmitting it to the media presentation device.

Preferably, the modification of the format of the OSD data depends on the capability of the media presentation device.

Preferably, the media sender device is operable, upon interruption of a connection to the media presentation device, to revert to a connection with the association server in order to re-establish the connection with the media presentation device.

Preferably the media sender device further comprises a remote control relay module operable to relay remote control signals from the media presentation device to the media receiver.

According to a third aspect of the present invention, there is provided an association server comprising:

a storage module operable to store media sender device identifiers and addresses;

a request receiving module operable to receive a request from a media presentation device, the request comprising a media sender device identifier;

a retrieval module operable to retrieve the corresponding media sender device address; and an address transmission module operable to return the retrieved address to the requesting media presentation device.

Preferably, the association server further comprises an identifier receiving module operable to receive a media sender device identifier from a media sender device and to store the received media sender device identifier in the storage module.

Preferably, the association server further comprises an activity status receiver module operable to receive a media sender device activity status from a media sender device and to store the media sender device activity status in the storage module and the address transmission module is operable to return the retrieved media sender device address to the requesting media presentation device conditional upon the activity status of the media sender device associated with the media sender device address.

Preferably, the association server is operable to provide further content to the media presentation device.

Preferably, the further content comprises advertisements.

Preferably, the further content comprises content specific to the geographic location of the media presentation device.

Preferably, the geographic location of the media presentation device is determined using an Internet Protocol address of the media presentation device.

Alternatively, the geographic location of the media presentation device is determined using feedback from a mobile phone network.

Preferably, the further content comprises content specific to the service provider providing the video content.

Preferably, the further content comprises content paid for by a third party with respect to a subscriber to the video content and the service provider providing the video content.

According to a fourth aspect of the present invention, there is provided a media presentation device comprising:

an address request transmission module operable to transmit a request to an association server, the request comprising a media sender device identifier;

an address receiving module operable to receive a media sender device address from the association server;

a video request transmission module operable to transmit a request for video content to a media sender device;

a video receiving module operable to receive video content from the media sender device; and a video output module operable to output the received video content.

Preferably, the media presentation device is operable, upon interruption of a connection to the media sender device, to revert to a connection with the association server in order to re-establish the connection with the media sender device.

Preferably, the media presentation device further comprises a remote control transmission module operable to transmit remote control signals to the media sender device.

Preferably, the media presentation device is operable to receive OSD data from the media sender device.

Preferably, the media presentation device is operable to receive the OSD data independently of the received video content.

Optionally, the media presentation device is operable to modify the format of the OSD data.

Preferably, the modification of the format of the OSD data depends on the video output capability of the media presentation device.

According to a fifth aspect of the present invention there is provided a place-shifting system comprising a media receiver according to the first aspect and a media sender device according to the second aspect.

Preferably, the place-shifting system further comprises a media presentation device according to the fourth aspect.

Preferably, the place-shifting system further comprises an association server according to the third aspect.

The present invention will now be described by way of example only with reference to the accompanying figures in which.

An embodiment of the present invention provides a place-shifting system enabling the transmission of video content from a STB to a remote location, with full content protection and conditional access.

Figure 1:
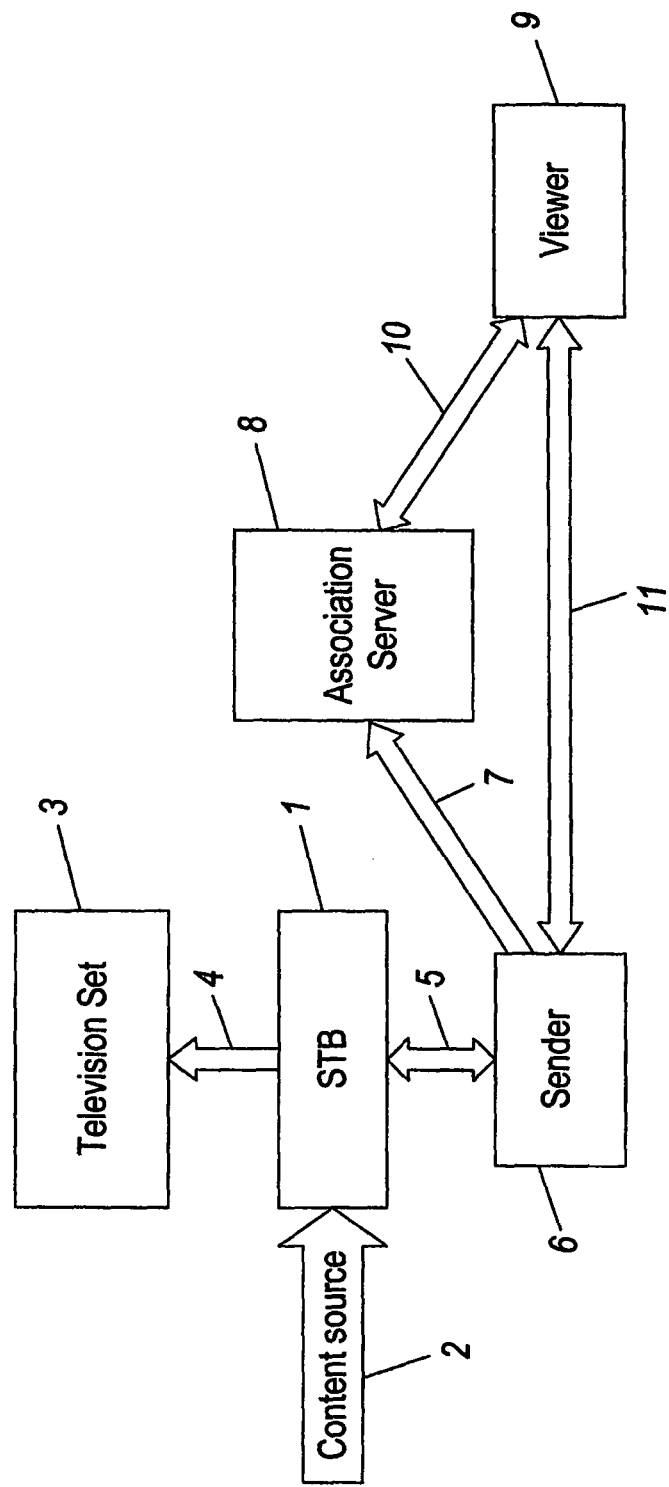
FIG. 1 illustrates, in schematic form, a place-shifting system and television set.

FIG. 1 shows one embodiment of the invention as follows. The media receiver in this embodiment is a STB (1) that is connected to a source of content (2) which could be from a satellite or cable or other source. The STB is connected to a TV set (3) via a connection (4). This connection (4) may be either an analogue audio/video connection, or a digital connection such as HDMI (High-Definition Multimedia Interface). The user can operate this system (1-4) as a standard multi-channel TV system.

In this embodiment, the media sending device is a video sender, also known as a thin server (6) is attached to the STB via a digital interface (5). The digital interface allows full two-way communication between the STB and the video sender.

The STB can determine the ability of a particular subscriber to use Place-Shifting, and can thus set up the access rights of the connected video sender.

The video sender (6) is also connected to a network (7) and uses this connection to communicate with an association server (8) which is held at a remote location. The video sender may connect to the association server using, for example:
- a LAN (Local Area Network) connection;
- a WLAN (Wireless Local Area Network) connection;
- WiMAX (Worldwide Interoperability Microwave Access) connection;
- a mobile phone network connection, such as GSM (Global System for Mobile communications), EDGE (Enhanced Data-rate for Gsm Evolution), 3G (3rd Generation) etc.; or
- a proprietary connection.

The video sender provides the association server with unique information identifying itself, and the association server stores this information, along with location information of the video sender (such as its IP—Internet Protocol—address).

In this embodiment, the media presentation device is a remote viewing device, or thin client (9). The viewing device requests connection to a specific video sender, by sending an association request to the association server (8) via a network connection (10), such as LAN/WAN/mobile phone network etc. This request contains unique information regarding the specific video sender requested by the viewing device. The Association Server returns location information specific to the video sender being requested to the viewing device.

The viewing device and video sender then communicate directly (11) to establish communication and to start transfer of video and other information. The viewing device can act as a remote control for the STB, allowing access to permitted functions, such as channel selection, etc.

Figure 2:
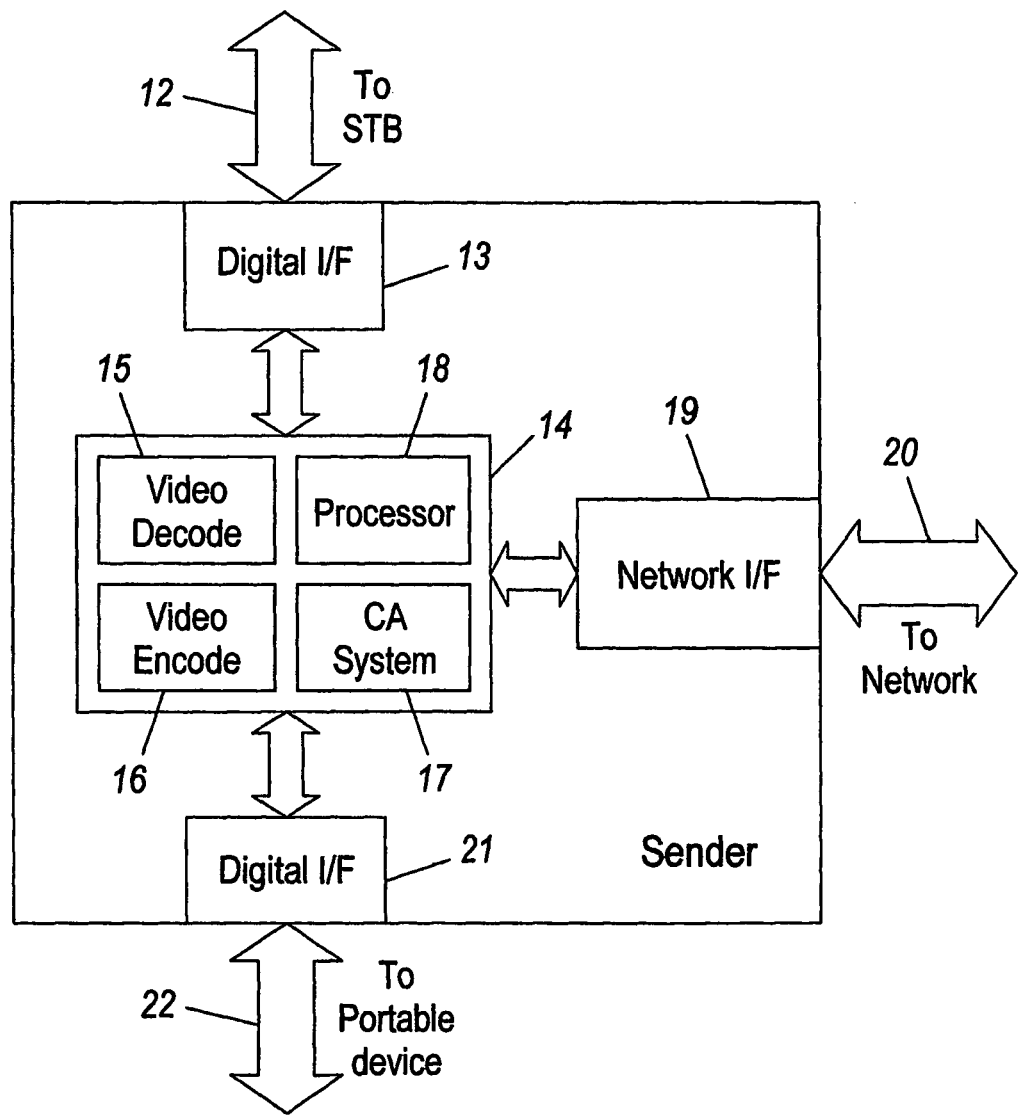
FIG. 2 illustrates, in schematic form, a video sender.

FIG. 2 shows an embodiment of the video sender (6) with a digital connection (12) to a STB. This digital connection (12) can be either an external interface or can be a connection internal to the STB. Therefore the video sender can be a physical device or an upgrade to an existing platform. The external digital interface between the STB and video sender may, for example, be:
- a Universal Serial Bus (USB) connection;
- an IEEE1394 connection;
- a LAN;
- a WLAN;
- HDMI (High-Definition Multimedia Interface); or
- a proprietary interface.

The STB is connected using the digital interface block (13) which conforms to the required standard. A system-on-chip (SOC) (14) contains the following blocks, Video Decode (15), Video Encode (16), Conditional Access (17) and a processor (18). The processor (18) controls the flow of data around the SOC, and the interfaces required. The video signal arriving from the STB over the digital interface (12, 13) is first decoded and then encoded to a higher compression standard (15, 16) The functionality of these blocks can be joined, creating a transcoding solution. The processor can determine the encoder targets based on a number of influences, such as target device (viewing device) screen size/capability and network speed (a measurement of the speed of connection between video sender and viewing device). The CA system (17) controls the content protection of the video sender system. The incoming data from the STB may use the encryption utilised for the transmission of the data to the STB from the content provider, another form of encryption, or the data may be un-encrypted or "in the clear". The CA system (17) can decrypt any standard encryption utilised to protect the data, to allow for the transcoding to take place. After the transcoding, content protection is applied to the resulting data before it is sent from the video sender. This content protection can be any of a number of methods, such as hardware based—SVP (Secure Video Processor), NOCS, or software based such as Videoguard™ from NDS Ltd.

The transcoded data along with content protection is then sent to the remote viewing device (viewing device) via the Network interface block (19) onto the network used to connect the devices (20).

Interactive TV services are supported by re-formatting screen display information for the screen size available within the viewing device.

The viewing device may be an independent physical device, with network connection, and a local screen or embedded function adding extra capability to an existing product, such as a mobile phone.

The connection speed between viewing device and video sender may be measured using the timestamp information on the packets of data being sent or by sending a specific size of data file from the video sender to the viewing device and measuring resulting speed. The connection speed may also be measured by using buffers to store data at both the viewing device and video sender, and measuring the variation in the buffer utilisation. The video transcoding target may be dynamically adjusted depending on the on-going measurement of the connection speed. The audio data may be prioritised above the video to improve the Quality of Service (QoS), while still retaining synchronisation between the audio and video data. The video compression settings may be dynamically adjusted depending on the connection speed available between viewing device and video sender, while retaining constant compression settings for the audio information. The audio and video compression standards used may be selected by the video sender, depending on the capability of the viewing device.

The capability of the viewing device to, display video/audio may affect the dynamic adjustment carried out within the video sender. The viewing device may be capable of a certain screen resolution, and after this resolution is reached by the video sender, it may adjust a new parameter and not increase the resolution further, when additional bandwidth is available. The viewing device may be capable of a certain frame rate, and after this frame rate is reached by the video sender, it will adjust a new parameter, and not increase the frame rate further, when additional bandwidth is available.

The minimum acceptable audio quality may be determined by the viewing device and provided to the video sender, and used to determine the remaining bandwidth available for the video signal.

In another embodiment, the video sender may be a capability embedded within a STB.

It is possible that the transcoded data can be sent to a local device instead of streaming, and this is enabled by the use of a second digital interface (21). This interface (21) is capable of controlling or hosting a local device, such as a PMP or some form of flash memory. The interface used (22) would most likely be USB or IEEE1394, but other interfaces are possible.

Figure 3:
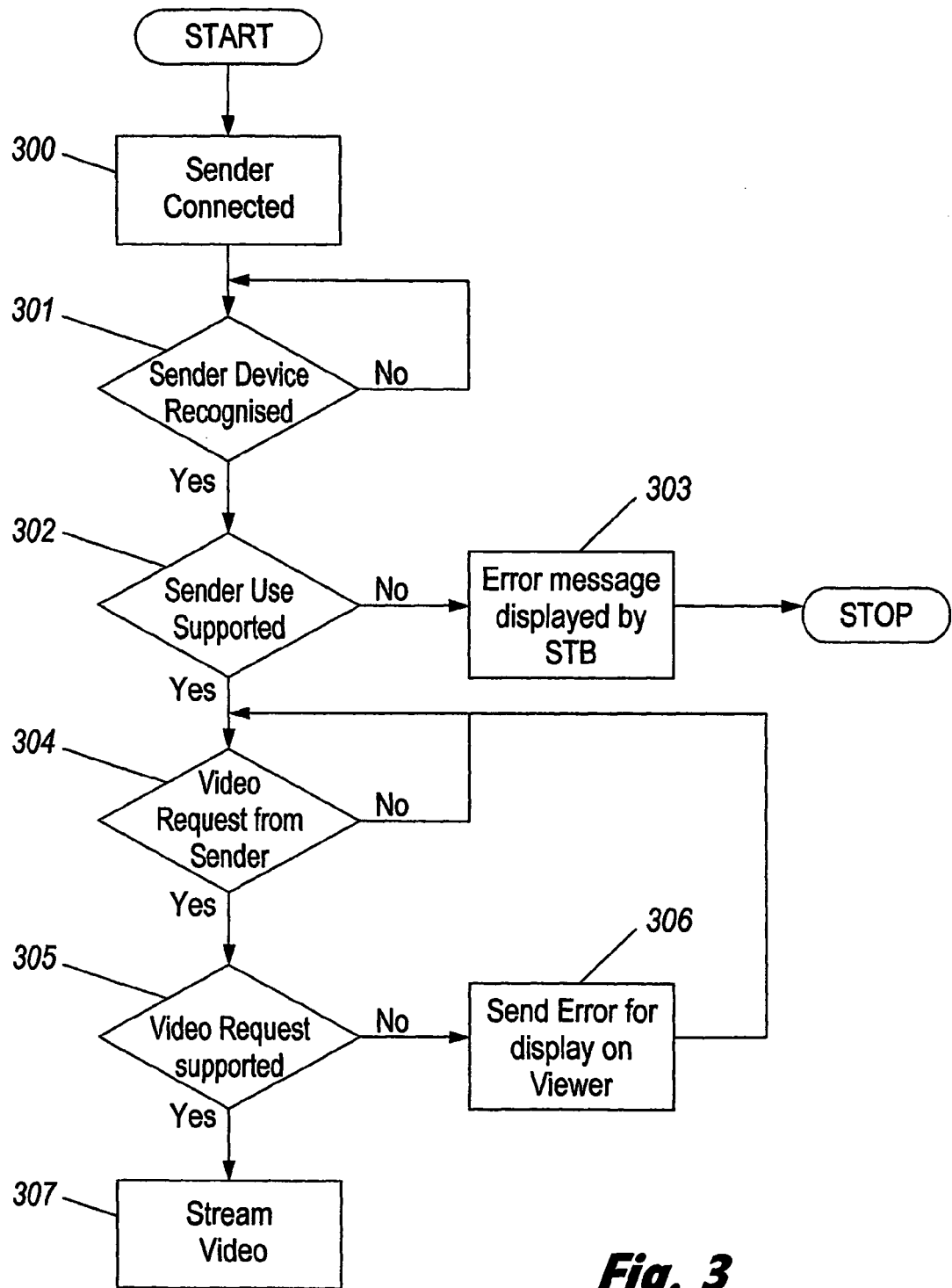
FIG. 3 illustrates, a flow chart of the operation of a Set-Top Box (STB) media receiver.

A flow chart showing a preferred embodiment of this invention is shown in FIG. 3, giving the processes used within the STB. The video sender is connected (300), or the feature is enabled by the user, and recognised (301). The STB then determines (302) if the use of video sender is supported by the users current subscription, if not an error message is displayed (303) by the STB on a locally connected TV. If the use of video sender is supported, then the STB will wait (304) for a video request to be received from video sender. This request is analysed (305) to ensure that it is permitted within the CA rules established, e.g. the channel selected can be displayed at the IP address of the viewing device wishing to view it. If the request is not permitted, an error message is sent (306) to the remote viewer, indicating the problems. If the request is permitted, then the video stream can start (307), and the STB can monitor the usage, depending on the contract in place. For example, the STB can use its existing billing back-end solution to enable a pay-per-view (PPV) solution, where the user pays a per minute/hour charge.

Using the integrated solution results in a more end to end solution and experience for the user. It is possible for the remote user, and a local viewer to be watching two different channels.

Figure 4:
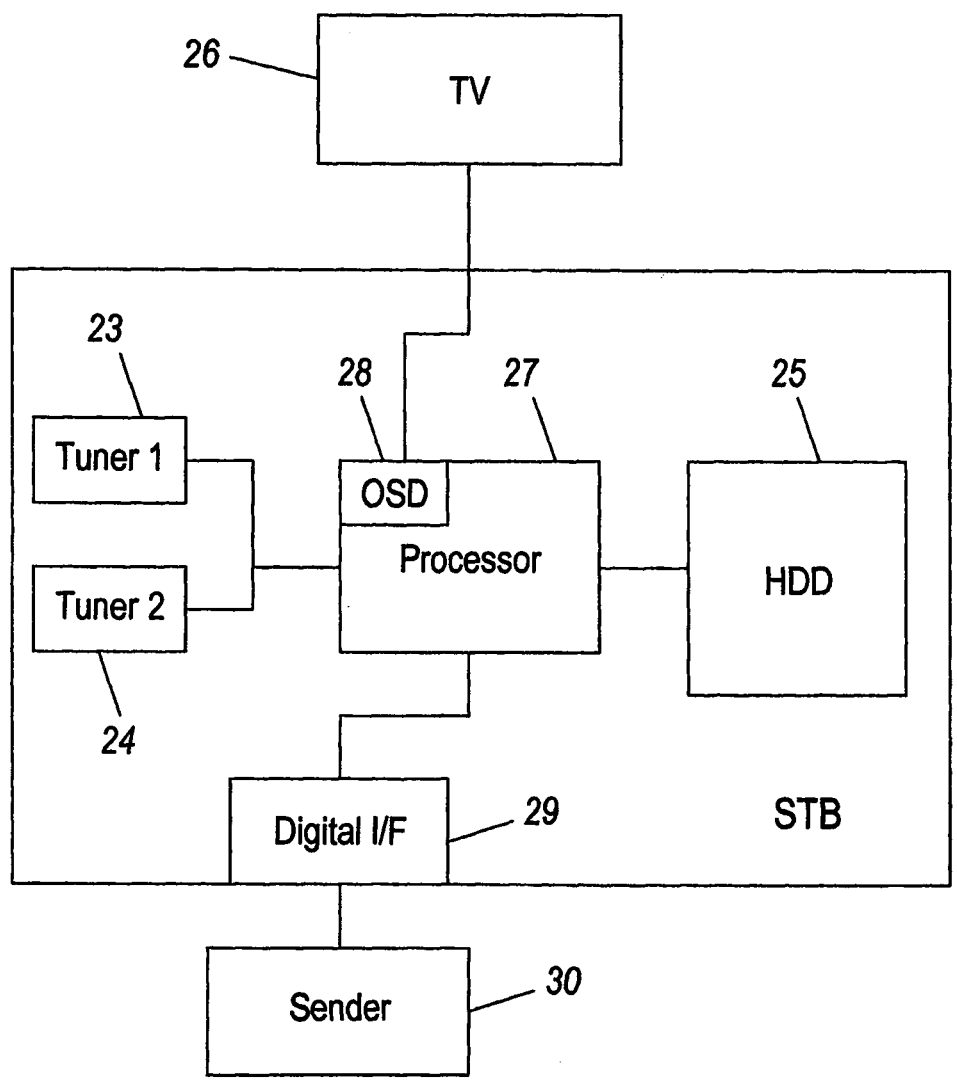
FIG. 4 illustrates, in schematic form, a Set-Top Box (STB).

FIG. 4 shows a typical DVR STB, which has at least two tuners (23, 24) for receiving content and a HDD (25). The local viewer normally views content sourced from tuner 1 (23) and this is displayed on a connected TV (26). If the local viewer wishes to record a second channel, then tuner 2 (24) is used and the content is stored on the HDD (Hard Disk Drive) (25). Further it is possible for the local user to record two channels (using 23, 24 and stored on 25) while viewing another event previously stored on the HDD (25).

When the remote user is accessing the STB, all sources of content are available. If the remote viewer wishes to watch the same channel as the local user, then tuner 1 (23) is used for both. If the remote user wishes a different channel, then the second tuner (24) can be used, allowing the local viewer to continue their experience uninterrupted. It is also possible for the remote viewer to access HDD (25) content separately to the local viewer. If a conflict arises, then a set of priorities can be established to allow arbitration between requests.

Modern STB have a detailed user interface, involving on-screen displays (OSD). These on-screen displays can convey a large amount of information, for example an Electronic Programme Guide (EPG) for selecting a particular programme/channel for display and recording. Other examples of OSD are, information—where a programme synopsis is displayed, and DVR menu—used to replay content and erase etc. All of the OSD are controlled by the main processor within the STB (27) using a specific section of the processor (28) to create a visual representation of the data. The OSD is designed to be readable on a TV set, which is typically >28" in size. When this content is viewed on a smaller screen, for example that of a mobile phone, the OSD becomes unreadable. Therefore an embodiment of this invention permits the OSD information to be sent as data via a digital interface (29) the video sender, (30) to the remote user (viewing device). The result of this is that the data can be formatted for the local screen, and displayed with clarity. An example of this is that, say, 10 channels are shown in a typical screen of a EPG, with information over 2 hours, for a mobile phone screen, say, 3 channels could be displayed at one time over 1 hour. This increases the user experience and usability. This method of operation also holds true for interactive TV services, which can be fully supported by an integrated system.

The services available to the remote viewer can be determined by the STB being used. This applies to the remote commands supported, as well the channel access rights as discussed previously. Therefore the viewing device may have access to a full set of remote control commands, or a sub-set. The STB would respond to commands sent by the viewing device in the same manner to those received via a local remote control, for example, commands would have the same response time regardless of the method of reception by the STB.

Figure 5:
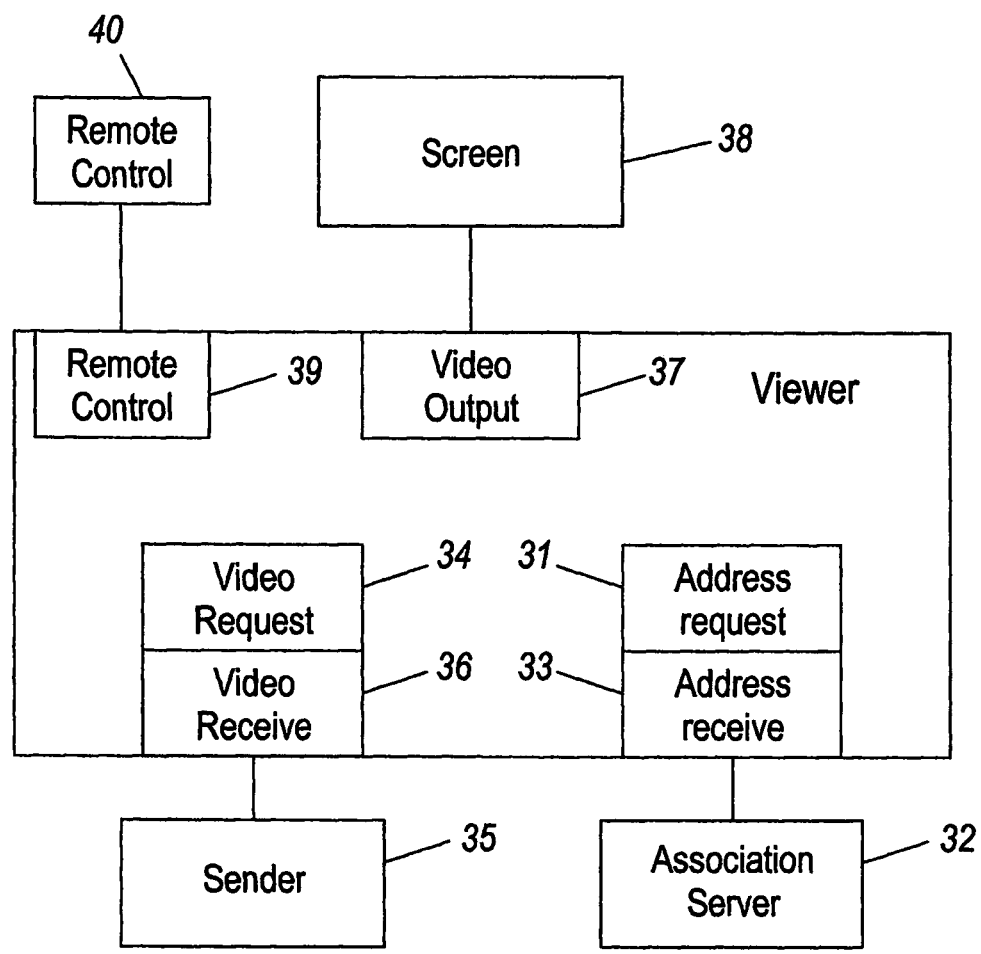
FIG. 5 illustrates, in schematic form, a viewer device.

FIG. 5 shows a viewer device. An address request transmission module (31) transmits a request to the association server (32), the request including a media sender device identifier. An address receiving module (33) receives a video sender address from the association server. A video request transmission module (34) transmits a request for video content to the video sender (35) at the address. A video receiving module (36) receives streamed video content from the video sender. A video output module (37) outputs the received video content to a screen (38).

Upon interruption of a connection to the video sender (37), the viewer reverts to a connection with the association server (32) in order to re-establish the connection with the video sender (35).

A remote control module (39) receives control signals from a remote control unit (40) and transmits the control signals to the video sender (35).

Figure 6:
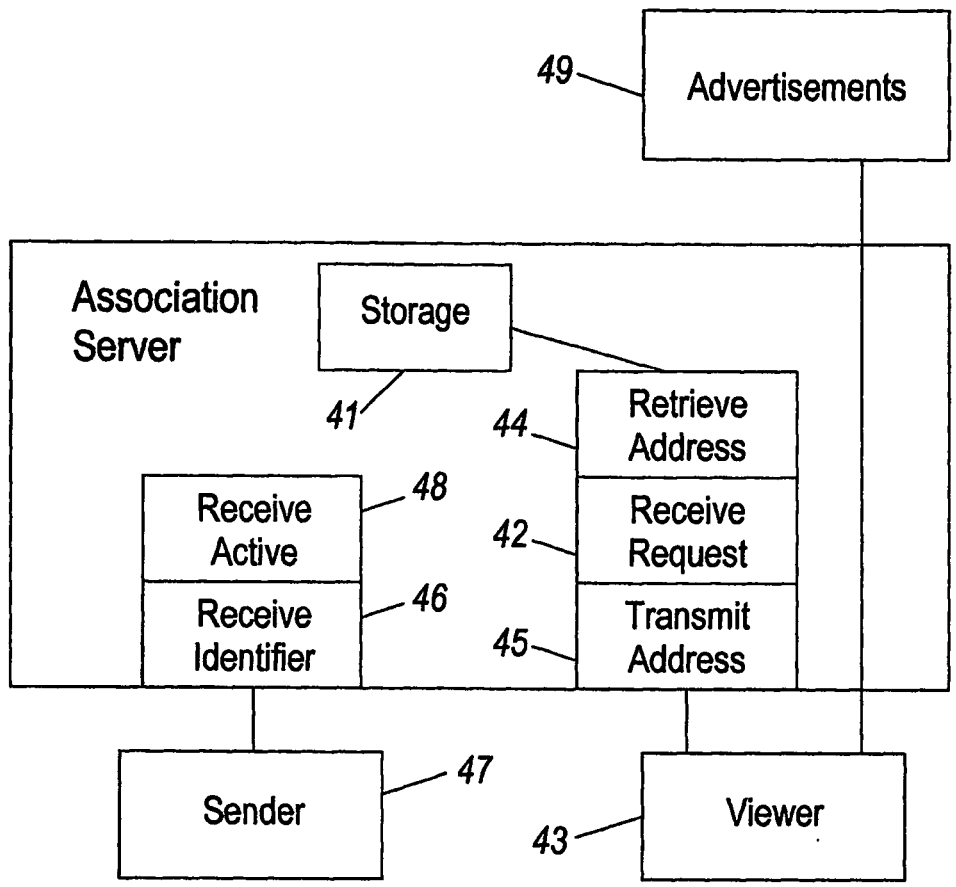
FIG. 6 illustrates, in schematic form, an association server.

FIG. 6 shows an association server. A storage module (41) stores media sender device identifiers and addresses. A request receiving module (42) receives a request from a viewer device (43), the request including a media sender device identifier. A retrieval module (44) retrieves the corresponding video sender address from the storage module (41) and an address transmission module (45) returns the retrieved address to the requesting viewer device (43).

An identifier receiving module (46) receives a media sender device identifier from a video sender (47) and stores the received media sender device identifier in the storage module (41).

An activity status receiver module (48) receives a video sender activity status from the video sender (47) and stores the activity status in the storage module (41). The address transmission module (45) may then return the retrieved address to the requesting viewer device (43) conditional upon the activity status of the video sender associated with that address.

The association server may also provide further content (49) to the viewer device, such as advertisements in this embodiment. The further content may include advertisements specific to the geographic location of viewer device as determined, using the IP address of the viewer device, or using feedback from a mobile phone network, or by other means.

The further content may include advertisements specific to the service provider providing the video content to the STB. The advertisements may be paid for by a third party in relation to a subscriber to the video content and the service provider providing the video content.

The integrated solution provided by aspects of the present invention allows for a complete end-to-end solution, resulting in a more complete user experience, and a higher degree of content protection for the content provider. The system allows for a satisfying user experience by formatting on-screen data for the users screen. Additionally the integrated system allows the remote user to access different content to that being accessed by a local user.

Further modifications and improvements may be added without departing from this scope of the invention described by the claims.

The invention claimed is:

1. A place-shifting system comprising:
 (a) a media receiver;
 (b) a media sender device, being a physical device or an upgrade to a set-top box or a capability embedded within a set-top box;
 (c) a media presentation device; and
 (d) an association server,
 the media receiver comprising:
  a media receiver digital interface operable to connect to the media sender device;
  a receiving module operable to receive a request for video content from the media sender device via the media receiver digital interface;
  a transmitting module operable to transmit video content to the media sender device responsive to the received request; and
  a conditional access system operable to determine access permissions and wherein the transmitting module is operable to transmit the video content to the media sender device conditional upon the determined access permissions, wherein the conditional access system is operable to determine access permissions associated with a subscription and to configure the access permissions of the media sender device,
  wherein the request for video content comprises an identifier of a media presentation device,
  wherein the conditional access system is operable to determine access permissions associated with the media presentation device using the identifier of the media presentation device, and wherein the access permissions relate to permitted channels
 the media sender device comprising:
  a media sender device digital interface operable to connect to the media receiver; a processor operable to transmit a request for video content to the media receiver via the media sender device digital interface, wherein the request for video comprises an identifier of the media presentation device;
  a receiving module operable to receive the requested video content from the media receiver;
  a sending module operable to transmit the received video content to the media presentation device;
  a content protection module operable to remove content protection from the video content after its reception from the media receiver and to apply content protection to the video content prior to its transmission to the media presentation device; and
  wherein the media sender device is operable to transmit an identifier of the media sender device to an association server,
  wherein the media sender device is operable, upon interruption of a connection to the media presentation device, to revert to a connection with the association server in order to re-establish the connection with the media presentation device,
 the presentation device comprising:
  an address request transmission module operable to transmit a request to an association server, the request comprising a media sender device identifier;
  an address receiving module operable to receive a media sender device address from the association server;
  a video request transmission module operable to transmit a request for video content to the media sender device;
  a video receiving module operable to receive video content from the media sender device;
  a video output module operable to output the received video content; a remote control transmission module operable to transmit remote control signals to the media sender device,
  wherein the media presentation device is operable to receive On-Screen Display data from the media sender device independently of the received video content, to modify the format of the On-Screen Display data depending on the video output capability of the media presentation device and, upon interruption of a connection to the media sender device, to revert to a connection with the association server in order to re-establish the connection with the media sender device,
 the association server comprising:
  a storage module operable to store media sender device identifiers and addresses;
  a request receiving module operable to receive a request from the media presentation device, the request comprising a media sender device identifier;
  a retrieval module operable to retrieve the corresponding media sender device address;
  an address transmission module operable to return the retrieved address to the requesting media presentation device;
  an identifier receiving module operable to receive a media sender device identifier from the media sender device and to store the received media sender device identifier in the storage module
  an activity status receiver module operable to receive a media sender device activity status from a media sender device and to store the media sender device activity status in the storage module and the address transmission module is operable to return the retrieved media sender device address to the requesting media presentation device conditional upon the activity status of the media sender device associated with the media sender device address.

2. A place-shifting system of claim 1 wherein the media sender device further comprises:
- a tuner module operable to provide video content for transmission to the media sender device;
- wherein the media receiver is operable to allow remote control of the tuner module via the digital interface to select a broadcast channel and the media receiver is operable to stream the selected broadcast channel from the tuner module to the media sender device.

3. The place-shifting system of claim 1, wherein the media sender device is operable to receive a request for video content from the media presentation device and the media sender device further comprises a decoder module operable to decode the received video content and an encoder module operable to encode the decoded video content, wherein the encoding comprises compression and
- wherein the content protection module is operable to apply content protection to the video content prior to its encoding and transmission to the media presentation device,
- wherein the encoder module is operable to encode the decoded video content depending on the capability of the media presentation device and to dynamically adjust the encoding depending on connection speed between the media sender device and the media presentation device.

4. The place-shifting system of claim 1 wherein the media sender device is operable to receive On-Screen Display data from the media receiver, to modify the format of the On-Screen display data prior to transmitting it to the media presentation device and depending on the capability of the media presentation device and to transmit the On-Screen Display data to the media presentation device independently of the transmitted video content.

5. The place-shifting system of claim 1 wherein the media receiver further comprises:
- a plurality of sources of video content; and
- a storage module operable to provide video content for transmission to the media sender device,
- wherein the transmitting module is operable to transmit first video content to the media sender device from a first source of the plurality of sources while the media receiver is operable to transmit second video content to a second media presentation device from a second source of the plurality of sources.

* * * * *